(12) United States Patent
Kim (10) Patent No.: US 8,978,845 B2
(45) Date of Patent: Mar. 17, 2015

(54) FREQUENCY/PRESSURE SENSITIVE SHOCK ABSORBER

(75) Inventor: Tae Ju Kim, Iksan-si (KR)

(73) Assignee: Mando Corporation, Gyeonggi-Do (KR)

( * ) Notice: Subject to any disclaimer, the term of this patent is extended or adjusted under 35 U.S.C. 154(b) by 121 days.

(21) Appl. No.: 13/595,530

(22) Filed: Aug. 27, 2012

(65) Prior Publication Data

US 2013/0056317 A1 Mar. 7, 2013

(30) Foreign Application Priority Data

Sep. 2, 2011 (KR) .......................... 10-2011-0089123

(51) Int. Cl.
*F16F 9/504* (2006.01)
*F16F 9/512* (2006.01)

(52) U.S. Cl.
CPC .................................... *F16F 9/5126* (2013.01)
USPC ............ 188/275; 188/280; 188/313; 188/317

(58) Field of Classification Search
CPC ................................ F16F 9/504; F16F 9/5126
USPC ........... 188/280, 281, 282.1, 282.8, 313, 316, 188/317, 275
See application file for complete search history.

(56) References Cited

U.S. PATENT DOCUMENTS

| 5,129,488 | A | * | 7/1992 | Furuya et al. | ............... | 188/282.6 |
| 5,248,014 | A | * | 9/1993 | Ashiba | ......... | 188/282.8 |
| 5,386,892 | A | * | 2/1995 | Ashiba | ......... | 188/282.8 |
| 7,958,981 | B2 | * | 6/2011 | Teraoka et al. | .......... | 188/322.15 |
| 2011/0056783 | A1 | * | 3/2011 | Teraoka et al. | ................ | 188/313 |
| 2013/0020158 | A1 | * | 1/2013 | Park | ................ | 188/280 |
| 2013/0140117 | A1 | * | 6/2013 | Yu | ................ | 188/280 |

FOREIGN PATENT DOCUMENTS

| EP | 1826454 A2 | * | 8/2007 |
| JP | 5-003676 U | | 1/1993 |
| JP | 6-065639 U | | 9/1994 |
| KR | 10 0894799 B1 | * | 4/2009 |

* cited by examiner

*Primary Examiner* — Thomas J Williams
(74) *Attorney, Agent, or Firm* — McDermott Will & Emery LLP (57) ABSTRACT

A frequency/pressure sensitive shock absorber for generating a damping force varying according to a frequency and a pressure-includes: a cylinder filled with a working fluid; a piston rod having one end located inside the cylinder and the other end extending outward from the cylinder; a main piston valve assembly installed at one end of the piston rod and configured to operate in a state that the inside of the cylinder is divided into an upper chamber and a lower chamber, and generate a damping force varying according to a moving speed; and a sensitive unit installed at one end of the piston rod under the main piston valve assembly and configured to generate a damping force varying according to a frequency and a pressure.

5 Claims, 6 Drawing Sheets

FREQUENCY/PRESSURE SENSITIVE SHOCK ABSORBER

CROSS-REFERENCE(S) TO RELATED APPLICATION

This application claims priority of Korean Patent Application No. 10-2011-0089123, filed on Sep. 2, 2011, in the Korean Intellectual Property Office, which is hereby incorporated by reference in its entirety.

BACKGROUND OF THE INVENTION

1. Field of the Invention

The present invention relates to a frequency/pressure sensitive shock absorber, and more particularly, to a frequency/pressure sensitive shock absorber which is capable of controlling respective damping forces at a small amplitude and a large amplitude in compression and rebound motions of a piston valve, thereby satisfying both the ride comfort and the control stability.

2. Description of the Related Art

In general, a suspension is installed in a vehicle to dampen a shock or vibration transferred from a road surface to an axle during driving. As one example of such a suspension, a shock absorber has been used.

A shock absorber operates according to a vibration of a vehicle caused by a state of a road surface. In this case, a damping force generated in the shock absorber varies according to an operating speed of the shock absorber, that is, a fast or slow operating speed thereof.

A vehicle ride comfort and a steering stability may be controlled according to how to adjust a characteristic of a damping force generated in a shock absorber. Therefore, in designing a vehicle, it is very important to adjust a characteristic of a damping force of a shock absorber.

A conventional piston valve is designed to have a constant damping characteristic at a high speed, a middle speed, and a low speed due to the use of a single flow passage. Therefore, when intending to improve a ride comfort by reducing a low-speed damping force, middle-speed and high-speed damping forces may also be affected. In addition, a conventional shock absorber has a configuration in which a damping force varies according to a change in a speed of a piston, regardless of a frequency or a stroke. In the case of the damping force varying according to only the change in the speed of the piston, the same damping force is generated even in various states of the road surface. Therefore, it is difficult to satisfy both the ride comfort and the steering stability.

Accordingly, there is a need for continuously conducting research and development on a valve structure of a shock absorber which can vary a damping force according to various road conditions, such as a frequency and a stroke, thereby satisfying both the vehicle ride comfort and the steering stability.

SUMMARY OF THE INVENTION

An aspect of the present invention is directed to provide a frequency/pressure sensitive shock absorber, which includes a sensitive unit configured to generate a damping force varying according to a frequency and a pressure, thereby satisfying both the vehicle ride comfort and the control stability.

According to another embodiment of the present invention, a frequency/pressure sensitive shock absorber for generating a damping force varying according to a frequency and a pressure includes: a cylinder filled with a working fluid; a piston rod having one end located inside the cylinder and the other end extending outward from the cylinder; a main piston valve assembly installed at one end of the piston rod and configured to operate in a state that the inside of the cylinder is divided into an upper chamber and a lower chamber, and generate a damping force varying according to a moving speed; and a sensitive unit installed at one end of the piston rod under the main piston valve assembly and configured to generate a damping force varying according to a frequency and a pressure, wherein the sensitive unit includes: a hollow housing fixed to one end of the piston rode; a free piston disposed to be vertically movable within the housing; and an auxiliary valve assembly mounted at a lower end of the housing and configured to generate a damping force by a flow of a working fluid between an inner space of the housing and the lower chamber.

The sensitive unit may further include an inner tube installed within the housing, and the free piston may be disposed to be vertically movable within the inner tube.

The inner tube may include at least one of a convex portion, a concave portion, a hole, and a cut-out portion, such that a passage communicating the upper chamber with the lower chamber within the cylinder is opened or closed according to a vertical movement of the free piston within the housing.

The free piston may move vertically within the inner space of the housing according to the frequency and the pressure, and may be supported by an upper elastic member and a lower elastic member, such that the free piston is returned to an initial position.

The inner space of the housing may communicate with the upper chamber through a connection passage formed inside the piston rod.

DESCRIPTION OF REFERENCE NUMERALS

| | |
|---|---|
| 10: cylinder | 11: upper chamber |
| 12: lower chamber | 20: piston rod |
| 21: connection passage | 30: main piston valve assembly |
| 31: main piston body | 32: main compression passage |
| 33: main rebound passage | 35: main compression valve unit |
| 37: main rebound valve unit | 39: band |
| 100, 200, 300: sensitive unit | 110, 210, 310: housing |
| 120, 220, 320: free piston | 130, 230, 330: inner tube |
| 131: upper concave portion | 132: lower concave portion |
| 140, 240, 340: auxiliary valve assembly | |
| 141, 241, 341: auxiliary valve body | |
| 142, 242, 342: auxiliary compression passage | |
| 143, 243, 343: auxiliary rebound passage | |
| 145, 245, 345: auxiliary compression valve unit | |
| 147, 247, 347: auxiliary rebound valve unit | |
| 157, 257, 357: upper spring | 158, 258, 358: lower spring |
| 231: ring-shaped concave portion | |

DETAILED DESCRIPTION OF EXEMPLARY EMBODIMENTS

Hereinafter, valve structures of frequency/pressure sensitive shock absorbers according to preferred embodiments of the present invention will be described in detail with reference to the accompanying drawings.

Figure 1:
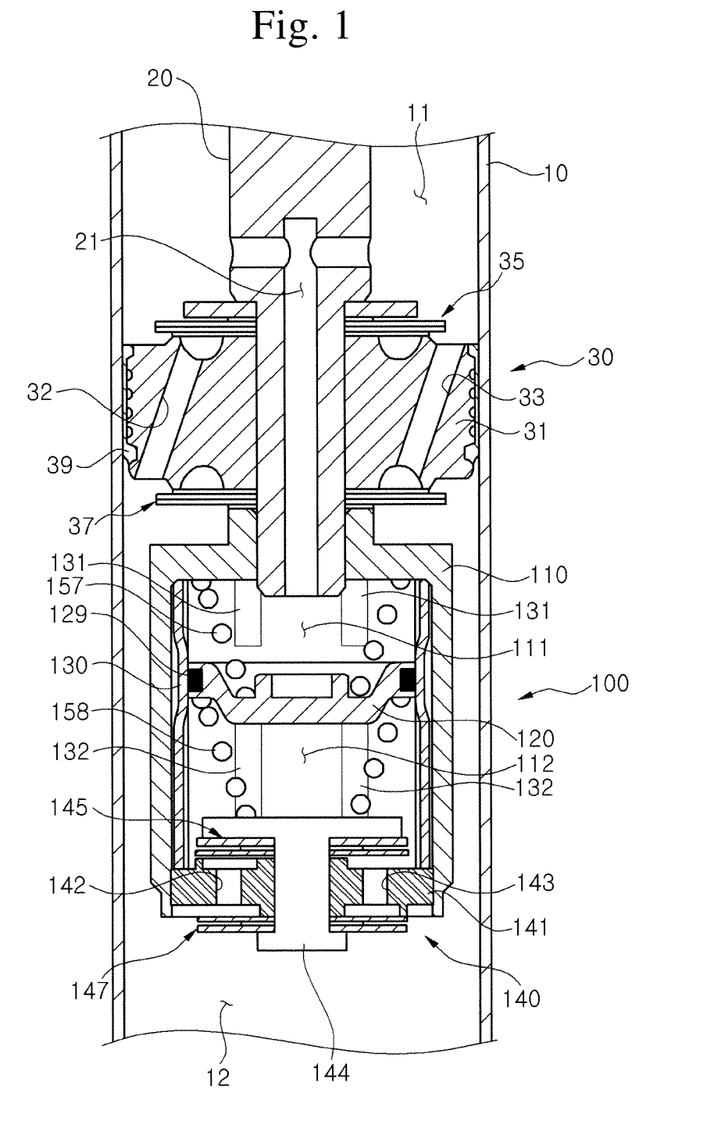
FIG. 1 is a cross-sectional view showing a valve structure of a frequency/pressure sensitive shock absorber according to the present invention.

As shown in FIG. 1, a frequency/pressure sensitive shock absorber according to the present invention includes an approximately cylindrical cylinder 10 filled with a working fluid such as oil, and a piston rod 20 having one end located inside the cylinder 10 and the other end extending outward from the cylinder 10.

The valve structure of the shock absorber according to the present invention includes a main piston valve assembly 30 and a sensitive unit 100. The main piston valve assembly 30 is installed in one end of the piston rod 20. The main piston valve assembly 30 operates in a state that the inside of the cylinder 10 is divided into an upper chamber 11 and a lower chamber 12, and generates a damping force varying according to a moving speed. The sensitive unit 100 moves together with the main piston valve assembly 30, and generates a damping force varying according to a frequency and a pressure.

The main piston valve assembly 30 and the sensitive unit 100 are successively installed at an end of the piston rod 20. The other end of the piston rod 20 is slidable along and liquid-tightly passes through a rod guide and an oil seal, and extends outward from the cylinder 10.

The main piston valve assembly 30 may include a main piston body 31, a main compression valve unit 35, and a main rebound valve unit 37. The main piston body 31 has at least one main compression passage 32, through which a working fluid passes during compression of the shock absorber, and at least one main rebound passage 33, through which a working fluid passes during rebound of the shock absorber. The main compression valve unit 35 is disposed above the main piston body 31 to generate a damping force against a pressure of the working fluid passing through the main compression passage 32. The main rebound valve unit 37 is disposed under the main piston body 31 to generate a damping force against a pressure of the working fluid passing through the main rebound passage 33.

In addition, a Teflon™ band 39 may be installed on the outer circumferential surface of the main piston body 31 in order for close contact with the inner circumferential surface of the cylinder 10 and prevention of friction.

The sensitive unit 100 according to the first embodiment includes a hollow housing 110, a free piston 120, and an auxiliary valve assembly 140. The inside of the housing 110 is empty, and the housing 110 is mounted at a lower end of the piston rod 20 such that it is disposed under the main piston valve assembly 30. The free piston 120 opens or closes a flow passage while moving within the housing 110. The auxiliary valve assembly 140 is mounted at a lower end of the housing 110.

The auxiliary valve assembly 140 includes an auxiliary valve body 141, an auxiliary compression valve unit 145, and an auxiliary rebound valve unit 147. The auxiliary valve body 141 has at least one auxiliary compression passage 142, through which the working fluid passes during compression of the shock absorber, and at least one auxiliary rebound passage 143, through which the working fluid passes during rebound of the shock absorber. The auxiliary compression valve unit 145 is disposed above the auxiliary valve body 141 to generate a damping force against a pressure of the working fluid passing through the auxiliary compression passage 142. The auxiliary rebound valve unit 147 is disposed under the auxiliary valve body 141 to generate a damping force against a pressure of the working fluid passing through the auxiliary rebound passage 143. A fixing member 144, including a rivet, a bolt, and a nut, is installed in the middle of the auxiliary valve body 141, such that the auxiliary compression valve unit 145 and the auxiliary rebound valve unit 147 are disposed above and under the auxiliary valve body 141.

The auxiliary valve body 141 of the auxiliary valve assembly 140 is fixed under the main piston valve assembly 30 by the housing 110. The inner space of the housing 110, in particular, an upper space 111 above the free piston 120, may communicate with the upper chamber 11 through a connection passage 21 formed inside the piston rod 20. The inner space of the housing 110 may be partitioned into the upper space 111 and the lower space 112 by the free piston 120.

The free piston 120 is installed to move vertically within the inner space of the housing 110 according to a frequency (amplitude). The free piston 120 is supported within the inner space of the housing 110 by an upper spring 157 as an upper elastic member and a lower spring 158 as a lower elastic member. The upper elastic member and the lower elastic member may be any one selected from a spring, a disk, and a clip. The upper elastic member and the lower elastic member may be any member that can support the free piston 120 by elasticity. The upper spring 157 and the lower spring 158 as the elastic members may be different in shape or modulus of elasticity, and various modifications may be made in design. In the case in which cone-type coil springs are used as the upper spring 157 and the lower spring 158, it is advantageous to improving a ride comfort and securing an additional free length.

A mount portion may be formed on the top surface of the free piston 120 such that the lower end of the upper spring 157 is mounted thereon. A mount portion may be formed on the bottom surface of the free piston 120 such that the upper end of the lower spring 158 is mounted thereon. The lower end of the lower spring 158 is mounted on the fixing member 144 of the auxiliary valve assembly 140. As in the case of the main piston valve assembly, a Teflon™ band 129 may be attached to the outer circumferential surface of the free piston 120.

According to the present invention, an inner tube 130, in which a convex portion, a concave portion, a hole, or a cut-out portion is formed, may be inserted into the housing 110 such that the passage communicating the upper chamber 11 with the lower chamber 12 within the cylinder 10 is opened or closed according to the vertical movement of the free piston 120 within the housing 110.

According to the first embodiment of the present invention, the inner tube 130 inserted into the housing 110 includes at least one upper concave portion 131, which is formed concavely on the inner surface of the inner tube 130, and at least one lower concave portion 132, which is not connected to the upper concave portion 131 but is formed in a straight line with the upper concave portion 131. When no external force is applied, the free piston 120 is disposed between the upper concave portion 131 and the lower concave portion 132. That is, when no external force is applied, the free piston 120 is maintained at a height where the concave portion is not formed, and does not allow the flow of the working fluid between the upper chamber 11 and the lower chamber 12. To this end, an internal diameter of the inner tube 130 in a region where the concave portion is not formed is substantially equal to an external diameter of the free piston 120.

According to the first embodiment of the present invention, when the passage between the upper space 111 and the lower space 112 is opened, the working fluid pressurizing the free piston 120 flows through this passage. In other words, according to the first embodiment of the present invention, since the working fluid pressurizing the free piston 120 flows through the passage to an opposite side of the free piston 120, the flow of the working fluid pressurizing the free piston 120 and the flow of the working fluid passing through the free piston and flowing to the opposite side are formed as a single flow, not separate flows.

Hereinafter, the operation of the valve structure according to the first embodiment of the present invention will be described with reference to FIGS. 2 and 3.

Figure 2:
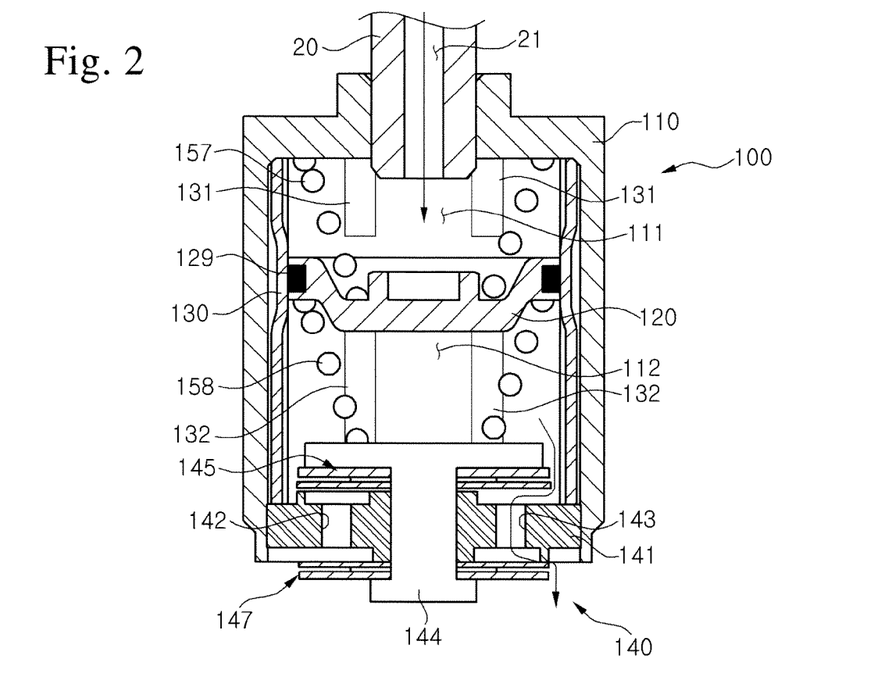
FIG. 2 is a cross-sectional view showing main parts for describing a fluid flow through a valve structure of a frequency/pressure sensitive shock absorber at a high frequency according to a first embodiment of the present invention.
Figure 3:
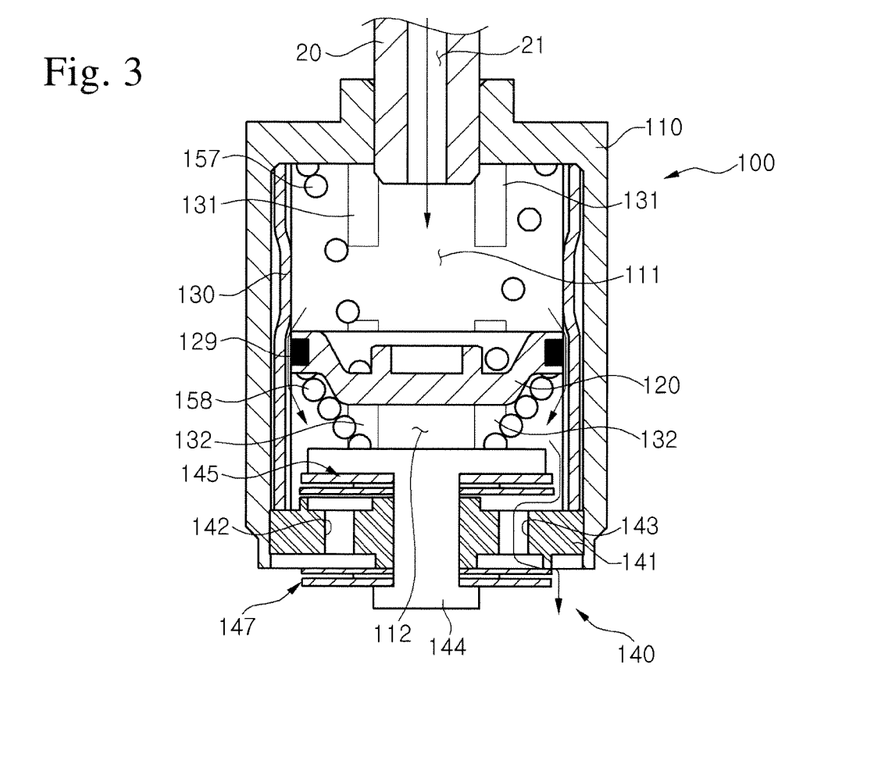
FIG. 3 is a cross-sectional view showing main parts for describing a fluid flow through a valve structure of a frequency/pressure sensitive shock absorber at a low frequency according to a first embodiment of the present invention.

FIG. 2 shows a position of the free piston 120 at a high frequency (that is, a small amplitude), and FIG. 3 shows a position of the free piston 120 at a low frequency (that is, a large amplitude). When the external force, such as the inertia and the pressure of the working fluid, is applied, the free piston 120 may move while compressing the upper spring 157 or the lower spring 158. That is, when the external force applied to the free piston 120 is strong enough to compress the upper spring 157 or the lower spring 158, the free piston 120 moves upward or downward.

FIG. 2 shows a state in which the external force applied to the free piston 120 is not strong enough to compress the upper spring 157 or the lower spring 158 because the movement amplitude of the piston rod of the shock absorber is small and the frequency thereof is high. In a state that the free piston 120 does not move, the outer surface of the free piston 120 is in contact with the inner surface of the inner tube 130 all over the entire periphery. Therefore, the flow of the working fluid is impossible. In this case, the working fluid of the upper chamber 11 may flow to the connection passage 21 formed inside the piston rod 20 and the upper space 11, that is, the space above the free piston 120 among the inner spaces of the housing 110, but a more flow is impossible by the free piston 120.

Also, since the external force is applied to the free piston 120, the free piston 120 moves. However, even when the external force applied to the free piston 120 is not strong enough to move the free piston 120 up to the upper concave portion 131 or the lower concave portion 132, the outer surface of the free piston 120 is in contact with the inner surface of the inner tube 130 all over the entire periphery. Therefore, in this case, the free piston 120 prevents the working fluid of the upper chamber 11 from flowing to the lower chamber 12, or prevents the working fluid of the lower chamber 12 from flowing to the upper chamber 11.

However, since the free piston 120 moves, the working fluid existing in the upper space 111 within the housing may flow through the connection passage 21 to the upper chamber 11, or the working fluid of the upper chamber 11 may flow through the connection passage 21 to the upper space 111 within the housing. Also, the working fluid existing in the lower space 112 within the housing may flow through the auxiliary valve assembly 140 to the lower chamber 12, or the working fluid of the lower chamber 12 may flow through the auxiliary valve assembly 140 to the lower space 112 within the housing.

In this case, the auxiliary valve assembly 140 generates a damping force by the flow of the working fluid generated when the free piston 120 moves.

As such, the damping force at the high frequency and the small amplitude is obtained by the main piston valve assembly 40 and is also obtained by the auxiliary valve assembly 140 as much as the flow amount of the working fluid according to the moving distance of the free piston 120. That is, since the damping force at the high frequency and the small amplitude can be obtained by the main piston valve assembly 40 and can also be obtained by the auxiliary valve assembly 140 as much as the movement of the free piston 120, the pressure applied to the main piston valve assembly 40 is dispersed toward the auxiliary valve assembly 140, and therefore, a softer damping force can be obtained.

FIG. 3 shows a state in which the external force applied to the free piston 120 is strong enough to compress the upper spring 157 or the lower spring 158 because the movement amplitude of the piston rod of the shock absorber is large and the frequency thereof is low. In this case, the working fluid of the upper chamber 11 may flow to the lower chamber 12 through the connection passage 21 formed inside the piston rod 20, the lower concave portion 132 formed on the inner surface of the inner tube 130, and the auxiliary valve assembly 140. The working fluid may also flow from the lower chamber 12 to the upper chamber 11. That is, the working fluid of the lower chamber 12 may flow to the upper chamber 11 through the auxiliary valve assembly 140, the lower concave portion 132 formed on the inner surface of the inner tube 130, and the connection passage 21 formed inside the piston rod 20.

Although only the state of the rebound stroke is shown in FIG. 3, the free piston 120 moves upward and the working fluid can flow through the upper concave portion 131, even when the external force applied to the free piston 120 is strong enough to compress the upper spring 157 because the movement amplitude of the piston rod of the shock absorber is large and the frequency thereof is low during the compression stroke.

As such, at the low frequency and the large amplitude, the damping force can be obtained by the main piston valve assembly 30 and the auxiliary valve assembly 140.

Hereinafter, a valve structure according to a second embodiment of the present invention will be described with reference to FIGS. 4 and 5. Since the valve structure according to the second embodiment is different in the sensitive unit from the valve structure according to the first embodiment, a description will focus on the difference therebetween.

The sensitive unit 200 according to the second embodiment includes a hollow housing 210, a free piston 220, and an auxiliary valve assembly 240. The inside of the housing 210 is empty, and the housing 210 is mounted at a lower end of the piston rod 20 such that it is disposed under the main piston valve assembly 30. The free piston 220 opens or closes a flow passage while moving within the housing 210. The auxiliary valve assembly 240 is mounted at a lower end of the housing 210.

The auxiliary valve assembly 240 includes an auxiliary valve body 241, an auxiliary compression valve unit 245, and an auxiliary rebound valve unit 247. The auxiliary valve body 241 has at least one auxiliary compression passage 242, through which a working fluid passes during compression of the shock absorber, and at least one auxiliary rebound passage 243, through which a working fluid passes during rebound of the shock absorber. The auxiliary compression valve unit 245 is disposed above the auxiliary valve body 241 to generate a damping force against a pressure of the working fluid passing through the auxiliary compression passage 242. The auxiliary rebound valve unit 247 is disposed under the auxiliary valve body 241 to generate a damping force against a pressure of the working fluid passing through the auxiliary rebound passage 243. A fixing member 244, including a rivet, a bolt, and a nut, is installed in the middle of the auxiliary valve body 241, such that the auxiliary compression valve unit 245 and the auxiliary rebound valve unit 247 are disposed above and under the auxiliary valve body 241.

The auxiliary valve body 241 of the auxiliary valve assembly 240 is fixed under the main piston valve assembly 30 by the housing 210. The inner space of the housing 210, in particular, an upper space 211 above the free piston 220, may communicate with the upper chamber 11 through a connection passage 21 formed inside the piston rod 20. The inner space of the housing 210 may be partitioned into the upper space 211 and the lower space 212 by the free piston 220.

The free piston 220 is installed to move vertically within the inner space of the housing 210 according to a frequency (amplitude). The free piston 220 is supported within the inner space of the housing 210 by an upper spring 257 as an upper elastic member and a lower spring 258 as a lower elastic member. The upper elastic member and the lower elastic member may be any one selected from a spring, a disk, and a clip. The upper elastic member and the lower elastic member may be any member that can support the free piston 220 by elasticity. The upper spring 257 and the lower spring 258 as the elastic members may be different in shape or modulus of elasticity, and various modifications may be made in design. In the case in which cone-type coil springs are used as the upper spring 257 and the lower spring 258, it is advantageous to improving a ride comfort and securing an additional free length.

A mount portion may be formed on the top surface of the free piston 220 such that the lower end of the upper spring 257 is mounted thereon. A mount portion may be formed on the bottom surface of the free piston 220 such that the upper end of the lower spring 258 is mounted thereon. The lower end of the lower spring 258 is mounted on the fixing member 244 of the auxiliary valve assembly 240. As in the case of the main piston valve assembly, a Teflon™ band 229 may be attached to the outer circumferential surface of the free piston 220.

According to the present invention, an inner tube 230, in which a convex portion, a concave portion, a hole, or a cut-out portion is formed, may be inserted into the housing 210 such that the passage communicating the upper chamber 11 with the lower chamber 12 within the cylinder 10 is opened or closed according to the vertical movement of the free piston 220 within the housing 210.

According to the second embodiment, the inner tube 230 inserted into the housing 210 has a ring-shaped concave portion 231 that is concavely formed in a ring shape on the inner surface thereof. When no external force is applied, the free piston 220 is disposed at a position where the ring-shaped concave portion 231 is formed. That is, when no external force is applied, the free piston 220 is maintained at a height where the concave portion is formed, and allows the flow of the working fluid between the upper chamber 11 and the lower chamber 12. On the other hand, when the external force is applied to move the free piston 220 vertically by more than a predetermined distance and thus the free piston 220 gets out of the region where the ring-shaped concave portion 231 is formed, the flow passage of the working fluid between the upper chamber 11 and the lower chamber 12 is closed by the free piston 220. To this end, an internal diameter of the inner tube 230 in a region where the concave portion is not formed is substantially equal to an external diameter of the free piston 220.

Hereinafter, the operation of the valve structure according to the second embodiment of the present invention will be described with reference to FIGS. 4 and 5.

Figure 4:
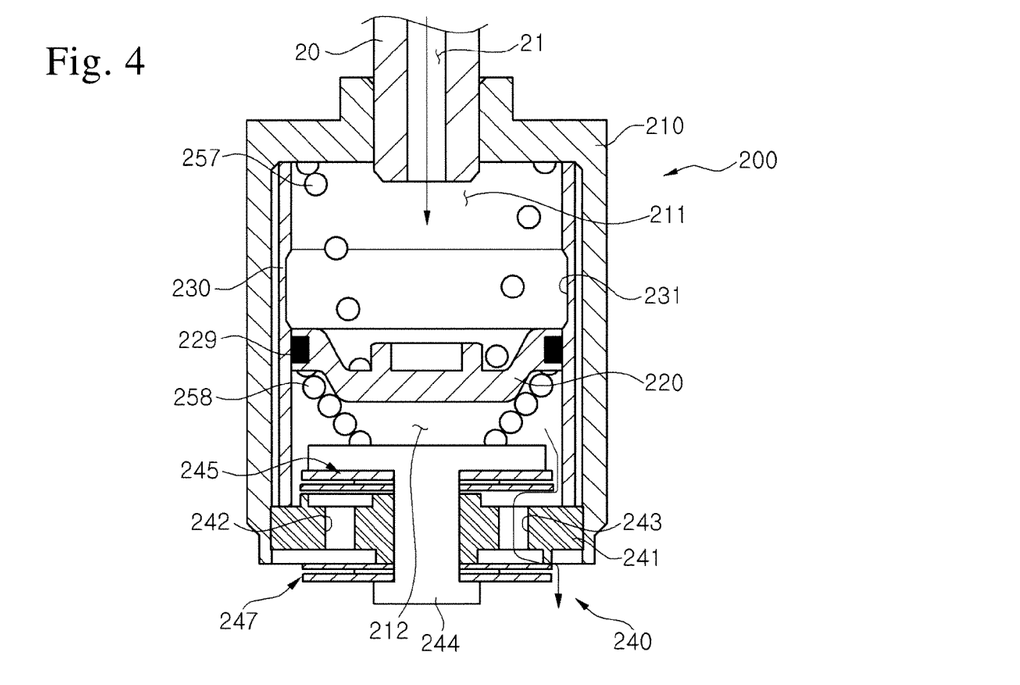
FIG. 4 is a cross-sectional view showing main parts for describing a fluid flow through a valve structure of a frequency/pressure shock absorber at a low frequency according to a second embodiment of the present invention.
Figure 5:
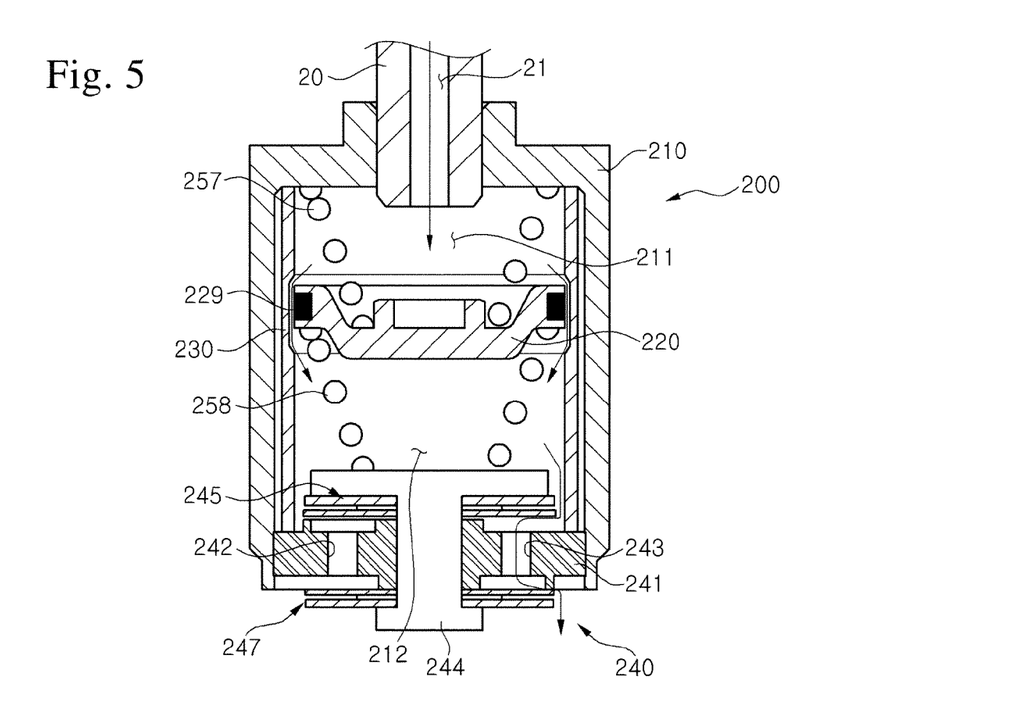
FIG. 5 is a cross-sectional view showing main parts for describing a fluid flow through a valve structure of a frequency/pressure sensitive shock absorber at a high frequency according to a second embodiment of the present invention.

FIG. 4 shows a position of the free piston 220 at a low frequency (that is, a large amplitude), and FIG. 5 shows a position of the free piston 220 at a high frequency (that is, a small amplitude). When the external force, such as the inertia and the pressure of the working fluid, is applied, the free piston 220 may move while compressing the upper spring 257 or the lower spring 258. That is, when the external force applied to the free piston 220 is strong enough to compress the upper spring 257 or the lower spring 258, the free piston 220 moves upward or downward.

FIG. 4 shows a state in which the external force applied to the free piston 220 is strong enough to compress the upper spring 257 or the lower spring 258 because the movement amplitude of the piston rod of the shock absorber is large and the frequency thereof is low. In a state that the free piston 220 moves, the outer surface of the free piston 220 is in contact with the inner surface of the inner tube 230 all over the entire periphery. Therefore, the flow of the working fluid is impossible. In this case, the working fluid of the upper chamber 11 may flow to the connection passage 21 formed inside the piston rod 20 and the upper space 211, that is, the space above the free piston 220 among the inner spaces of the housing 210, but a more flow is impossible by the free piston 220.

Although only the state of the rebound stroke is shown in FIG. 4, the free piston 220 moves upward and the flow of the working fluid is impossible, even when the external force applied to the free piston 220 is strong enough to compress the upper spring 257 because the movement amplitude of the piston rod of the shock absorber is large and the frequency thereof is low during the compression stroke.

As such, at the low frequency and the large amplitude, the working fluid can mainly flow through the main piston valve assembly 30. Therefore, the damping force is mainly obtained by the main piston valve assembly 40.

FIG. 5 shows a state in which the external force applied to the free piston 220 is not strong enough to compress the upper spring 257 or the lower spring 258 because the movement amplitude of the piston rod of the shock absorber is small and the frequency thereof is high. In this case, the working fluid of the upper chamber 11 may flow to the lower chamber 12 through the connection passage 21 formed inside the piston rod 20, the ring-shaped concave portion 232 formed on the inner surface of the inner tube 230, and the auxiliary valve assembly 240. The working fluid may also flow from the lower chamber 12 to the upper chamber 11. That is, the working fluid of the lower chamber 12 may flow to the upper chamber 11 through the auxiliary valve assembly 240, the ring-shaped concave portion 232 formed on the inner surface of the inner tube 230, and the connection passage 21 formed inside the piston rod 20.

As such, at the high frequency and the small amplitude, the damping force can be obtained by the main piston valve assembly 30 and the auxiliary valve assembly 240.

Figure 6:
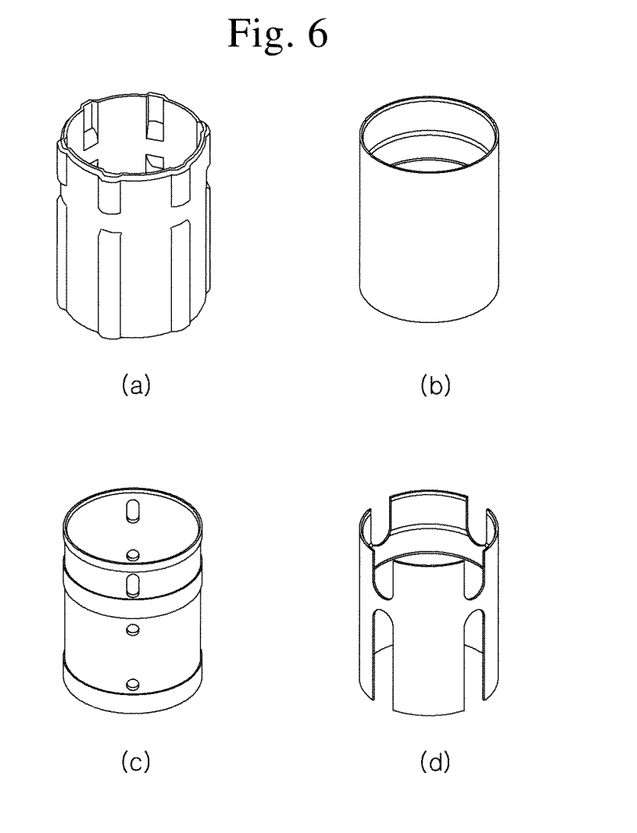
FIGS. 6A to 6D are perspective views of inner tubes having various shapes according to the present invention.

Inner tubes having various shapes are shown in FIGS. 6A to 6D. FIG. 6A is a perspective view of the inner tube 130 applied to the first embodiment of the present invention. In the example of FIG. 6A, upper and lower concave portions are formed by pressurizing a cylindrical tube by a press or the like. An example in which an inner surface is processed in a circumferential direction is shown in FIG. 6B. If necessary, a plurality of holes may be formed in the cylindrical tube as shown in FIG. 6C, or the inner tube may be manufactured by forming cut-out portions in upper and lower sides as shown in FIG. 6D.

Hereinafter, a valve structure according to a third embodiment of the present invention will be described with reference to FIGS. 7 to 9. Since the valve structure according to the third embodiment is different in the sensitive unit from the valve structure according to the first embodiment, a description will focus on the difference therebetween.

The sensitive unit 300 according to the third embodiment includes a hollow housing 310, a free piston 320, and an auxiliary valve assembly 340. The inside of the housing 310 is empty, and the housing 310 is mounted at a lower end of the piston rod 20 such that it is disposed under the main piston valve assembly 30a. The free piston 320 opens or closes a flow passage while moving within the housing 310. The auxiliary valve assembly 340 is mounted at a lower end of the housing 310.

Figure 7:
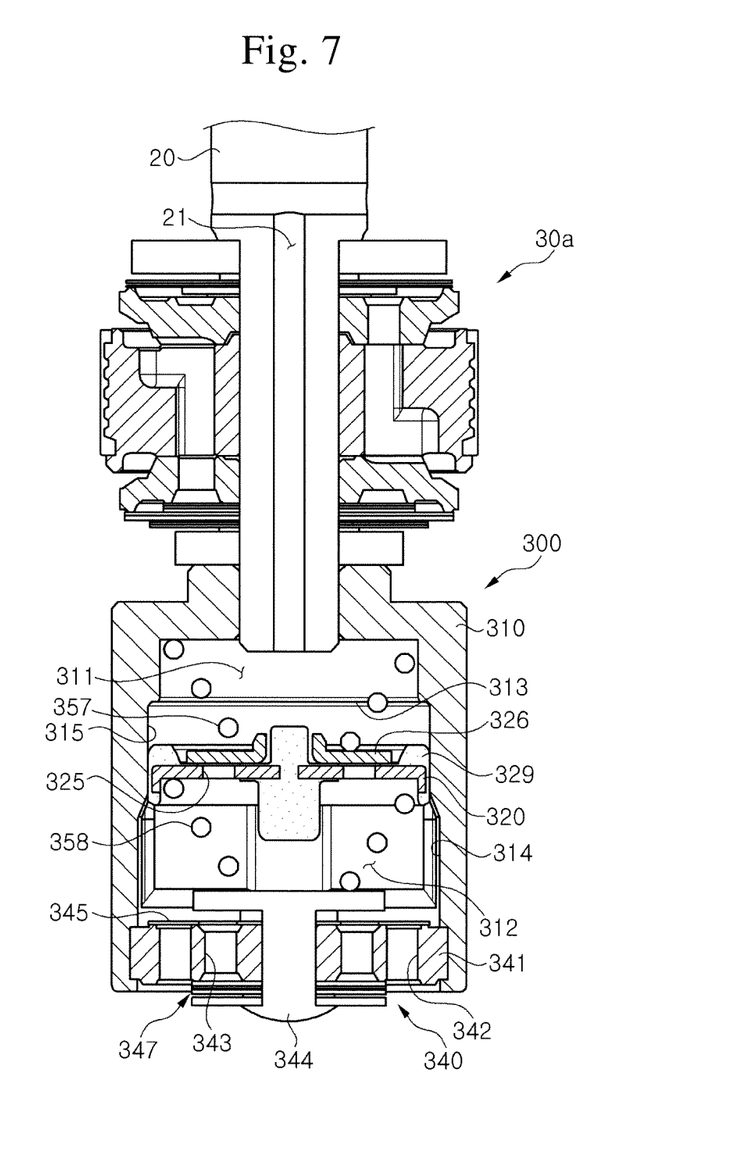
FIG. 7 is a cross-sectional view showing a valve structure of a frequency/pressure sensitive shock absorber according to a third embodiment of the present invention.

Although the main piston valve assembly 30a of FIG. 7 is shown as having a different configuration from the main piston valve assembly 30 of FIG. 1, the configurations of the main piston valve assemblies 30 and 30a are merely exemplary and the present invention is not limited by the configurations of the main piston valve assemblies.

The auxiliary valve assembly 340 includes an auxiliary valve body 341, an auxiliary compression valve unit 345, and an auxiliary rebound valve unit 347. The auxiliary valve body 341 has at least one auxiliary compression passage 342, through which a working fluid passes during compression of the shock absorber, and at least one auxiliary rebound passage 343, through which a working fluid passes during rebound of the shock absorber. The auxiliary compression valve unit 345 is disposed above the auxiliary valve body 341 to generate a damping force against a pressure of the working fluid passing through the auxiliary compression passage 342. The auxiliary rebound valve unit 347 is disposed under the auxiliary valve body 341 to generate a damping force against a pressure of the working fluid passing through the auxiliary rebound passage 343. A fixing member 344, including a rivet, a bolt, and a nut, is installed in the middle of the auxiliary valve body 341, such that the auxiliary compression valve unit 345 and the auxiliary rebound valve unit 347 are disposed above and under the auxiliary valve body 341.

Although the auxiliary valve assembly 340 of FIG. 7 is shown as having a different configuration from the auxiliary valve assembly 140 of FIG. 1, the configurations of the auxiliary valve assemblies 140 and 340 are merely exemplary.

The auxiliary valve body 341 of the auxiliary valve assembly 340 is fixed under the main piston valve assembly 30a by the housing 310. The inner space of the housing 310, in particular, an upper space 311 above the free piston 320, may communicate with the upper chamber 11 through a connection passage 21 formed inside the piston rod 20. A lower space 312 under the free piston 320 may communicate with the lower chamber 12 through the auxiliary valve assembly 340. The inner space of the housing 310 may be partitioned into the upper space 311 and the lower space 312 by the free piston 320.

The free piston 320 is installed to move vertically within the inner space of the housing 310 according to a frequency (amplitude). The free piston 320 is supported within the inner space of the housing 310 by an upper spring 357 as an upper elastic member and a lower spring 358 as a lower elastic member. The upper elastic member and the lower elastic member may be any one selected from a spring, a disk, and a clip. The upper elastic member and the lower elastic member may be any member that can support the free piston 320 by elasticity. The upper spring 357 and the lower spring 358 as the elastic members may be different in shape or modulus of elasticity, and various modifications may be made in design. In the case in which cone-type coil springs are used as the upper spring 357 and the lower spring 358, it is advantageous to improving a ride comfort and securing an additional free length.

The free piston 320 has a through-hole 325 that is opened during a low-frequency compression to allow the working fluid to flow from the lower space 312 to the upper space 311. If no external force is applied, the through-hole 325 maintains a state closed by a valve body 326. The valve body 326 is stacked on the upper surface of the free piston 320. The lower end of the upper spring 357 is mounted on the valve body 326. Accordingly, the valve body 326 is pressurized toward the free piston 320. A mount portion may be formed on the bottom surface of the free piston 320 such that the upper end of the lower spring 358 is mounted thereon. The lower end of the lower spring 358 is mounted on the fixing member 344 of the auxiliary valve assembly 340.

As in the case of the first and second embodiments, a Teflon™ band may be attached to the outer circumferential surface of the free piston 320. On the other hand, in the third embodiment, a lip portion 329 made of a rubber may be integrally formed. The lip portion 329 may closely contact the inner surface of the housing 310 and perform a sealing function.

According to the third embodiment, instead of inserting the separate inner tube into the housing 310, a stepped portion 313 and a plurality of groove portions 314 may be directly formed on the inner surface of the housing 310 when needed. Accordingly, as the free piston 320 moves vertically within the housing 310, the passage communicating the upper chamber 11 with the lower chamber 12 within the cylinder 10 may be opened or closed.

According to the third embodiment, the stepped portion 313 limiting the movement of the free piston 320 is formed on the inner surface of the upper space 311 of the housing 310. The plurality of groove portions 314 are formed on the inner surface of the lower space 312 of the housing 310. An intermediate portion 315 is formed between the stepped portion 313 and the groove portion 314 on the inner surface of the housing 310. The intermediate portion 315 has an internal diameter substantially equal to an external diameter of the free piston 320, more specifically, an external diameter of the lip portion 329 integrally formed at a circumferential edge of the free piston 320. When no external force is applied, the free piston 320 is disposed at the intermediate portion 315 of the housing 310.

When no external force is applied, the free piston 320 is disposed at the intermediate portion 315. Accordingly, the free piston 320 does not allow the flow of the working fluid between the upper chamber 11 and the lower chamber 12. On the other hand, when the external force is applied to move the free piston 320 downward by more than a predetermined distance and thus the free piston 315 gets out of the intermediate portion 315, the working fluid may flow through the groove portions 314. In addition, when the external force is applied to move upward the valve body 326 stacked on the upper surface of the free piston 320 while compressing the upper spring 357, the through-hole 325 is opened to allow the flow of the working fluid.

According to the third embodiment of the present invention, when the passage between the upper space 311 and the lower space 312 is opened, the working fluid pressurizing the free piston 320 flows through this passage.

In other words, according to the third embodiment of the present invention, since the working fluid pressurizing the free piston 320 flows through the passage to an opposite side of the free piston 320, the flow of the working fluid pressurizing the free piston 320 and the flow of the working fluid passing through the free piston 320 and flowing to the opposite side of the free piston 320 are formed as a single flow, not separate flows.

Hereinafter, the operation of the valve structure according to the third embodiment of the present invention will be described with reference to FIGS. 7 to 9.

FIG. 7 shows a position of the free piston 320 in an initial state in which no external force is applied. FIG. 8 shows a position of the free piston 320 during a low-frequency (that is, large-amplitude) compression, and FIG. 9 shows a position of the free piston 320 during a low-frequency (that is, large-amplitude) rebound. When the external force, such as the inertia and the pressure of the working fluid, is applied, the free piston 320 may move while compressing the upper spring 357 or the lower spring 358. That is, when the external force applied to the free piston 320 is strong enough to compress the upper spring 357 or the lower spring 358, the free piston 320 moves upward or downward.

FIG. 7 shows a state in which the external force applied to the free piston 320 is not strong enough to compress the upper spring 357 or the lower spring 358 because the movement amplitude of the piston rod of the shock absorber is small and the frequency thereof is high. In a state that the free piston 320 is located at the intermediate portion 315, the outer surface of the free piston 320 is in contact with the intermediate portion 315 of the inner surface of the housing. Therefore, the flow of the working fluid between the upper space 311 and the lower space 312 is impossible.

Figure 8:
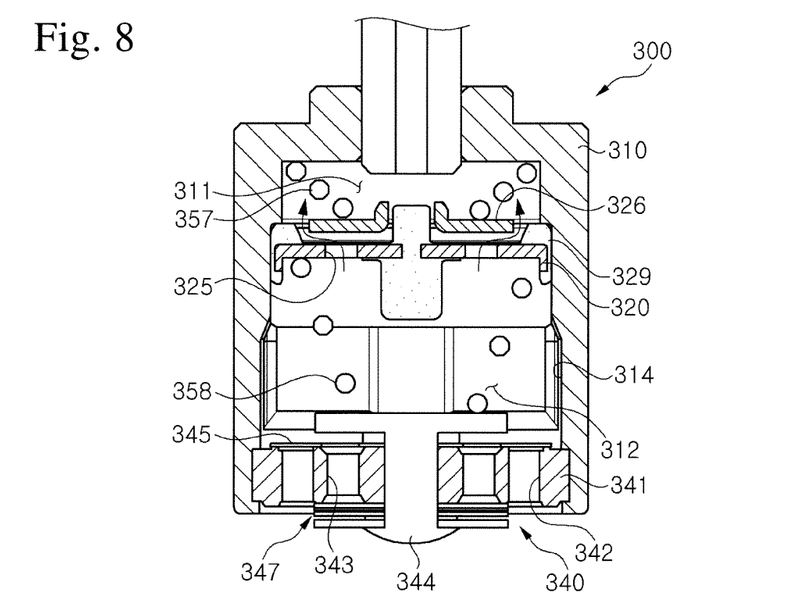
FIG. 8 is a cross-sectional view showing main parts for describing a fluid flow through a valve structure of a frequency/pressure sensitive shock absorber in a low-frequency compression mode according to a third embodiment of the present invention.

FIG. 8 shows a state in which the external force applied to the free piston 320 is strong enough to compress the upper spring 357 because the downward-movement amplitude of the piston rod of the shock absorber is large and the frequency thereof is low. When the free piston 320 moving while compressing the upper spring 257 comes into contact with the stepped portion 313, further movement of the free piston 320 is limited. In this case, when the external force is continuously applied, the valve body 326 closing the through-hole 325 moves while further compressing the upper spring 357. Accordingly, the through-hole 325 is opened, and the working fluid may flow from the lower space 312 to the upper space 311.

Figure 9:
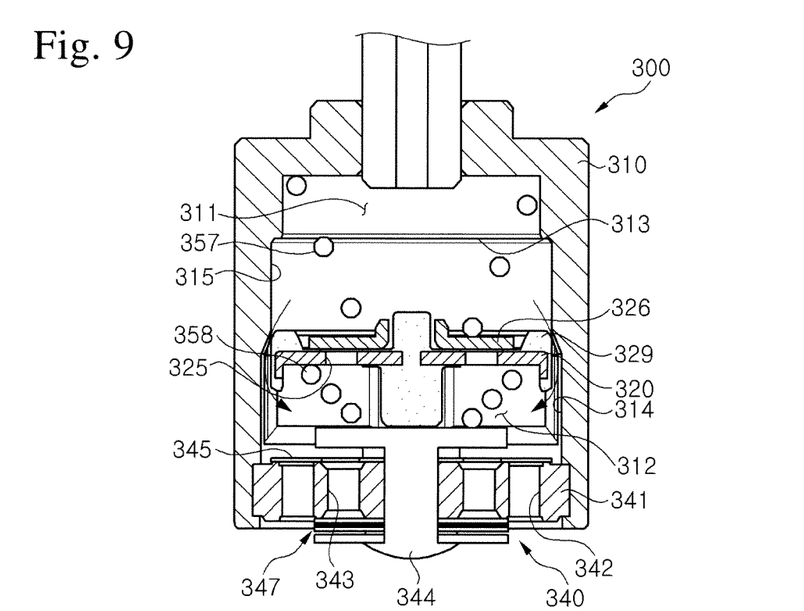
FIG. 9 is a cross-sectional view showing main parts for describing a fluid flow through a valve structure of a frequency/pressure sensitive shock absorber in a low-frequency rebound mode according to a third embodiment of the present invention.

FIG. 9 shows a state in which the external force applied to the free piston 320 is strong enough to compress the upper spring 358 because the upward-movement amplitude of the piston rod of the shock absorber is large and the frequency thereof is low. When the free piston 320 moving while compressing the lower spring 358 moves down to a region where the groove portion 314 is formed, the passage allowing the flow of the working fluid is opened and thus the working fluid can flow to the lower space 312.

According to the present invention described above, there is provided the frequency/pressure sensitive shock absorber, including a sensitive unit configured to generate a damping force varying according to frequency and pressure.

Therefore, the shock absorber manufactured by the manufacturing method according to the present invention can satisfy both the vehicle ride comfort and the steering stability.

The sensitive unit according to the present invention can vary the damping force sensitive to the pressure as well as the temperature. Therefore, when a high-pressure flow is input, the load can be absorbed at a sub-valve included in the sensitive unit, together with a main valve. Hence, shock energy applied to the shock absorber as a whole can be effectively dispersed and absorbed.

While the frequency/pressure sensitive shock absorber according to the present invention has been described with reference to the specific embodiments, it will be apparent to those skilled in the art that various changes and modifications may be made without departing from the spirit and scope of the invention as defined in the following claims.

What is claimed is:

1. A frequency/pressure sensitive shock absorber for generating a damping force varying according to a frequency and a pressure, comprising:
    a cylinder filled with a working fluid;
    a piston rod having one end located inside the cylinder and the other end extending outward from the cylinder;
    a main piston valve assembly installed at one end of the piston rod and configured to operate in a state that the inside of the cylinder is divided into an upper chamber and a lower chamber, and generate a damping force varying according to a moving speed; and
    a sensitive unit installed at one end of the piston rod under the main piston valve assembly and configured to generate a damping force varying according to the frequency and the pressure,
    wherein the sensitive unit comprises:
    a hollow housing fixed to one end of the piston rod;
    an inner tube installed within the hollow housing;
    a free piston disposed to be vertically movable within the inner tube; and
    an auxiliary valve assembly mounted at a lower end of the housing and configured to generate a damping force by a flow of the working fluid between an inner space of the housing and the lower chamber,
    wherein the inner space of the housing is divided into an upper space and a lower space by the free piston,
    wherein the working fluid of the lower chamber may pressurize the free piston after passing through the auxiliary valve assembly when the shock absorber is compressed,
    wherein an upper concave portion and a lower concave portion are formed on an inner surface of the inner tube,
    wherein when an amplitude of the piston rod is small and a frequency thereof is high, the free piston is disposed between the upper concave portion and the lower concave portion to prevent the working fluid from flowing between the upper space and the lower space, and wherein when the amplitude of the piston rod is large and the frequency thereof is low, the free piston vertically moves toward the upper concave portion or the lower concave portion to allow the working fluid to flow between the upper space and the lower space.

2. The frequency/pressure sensitive shock absorber according to claim 1, wherein the free piston moves vertically within the inner space of the housing according to the frequency and the pressure, and is supported by an upper elastic member and a lower elastic member, such that the free piston is returned to an initial position.

3. The frequency/pressure sensitive shock absorber according to claim 1, wherein the inner space of the housing communicates with the upper chamber through a connection passage formed inside the piston rod.

4. The frequency/pressure sensitive shock absorber according to claim 1, wherein the lower concave portion is aligned in a straight line and spaced-apart from the upper concave portion.

5. The frequency/pressure sensitive shock absorber according to claim 1, wherein a plurality of upper concave portions and a plurality of lower concave portions are formed on the inner surface of the inner tube.

* * * * *